(12) United States Patent
Hirano et al.

(10) Patent No.: US 7,992,901 B2
(45) Date of Patent: Aug. 9, 2011

(54) STRADDLING TYPE OF VEHICLE

(75) Inventors: Fumito Hirano, Shizuoka-ken (JP); Satoshi Suzuki, Shizuoka-ken (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 743 days.

(21) Appl. No.: 10/597,472

(22) PCT Filed: Jan. 17, 2005

(86) PCT No.: PCT/JP2005/000502
§ 371 (c)(1),
(2), (4) Date: Aug. 5, 2008

(87) PCT Pub. No.: WO2005/070750
PCT Pub. Date: Aug. 4, 2005

(65) Prior Publication Data
US 2008/0283321 A1 Nov. 20, 2008

(30) Foreign Application Priority Data
Jan. 27, 2004 (JP) .................................. 2004-018814

(51) Int. Cl.
B60P 3/22 (2006.01)
B62K 11/00 (2006.01)

(52) U.S. Cl. ....................................... 280/833; 280/835

(58) Field of Classification Search .................. 180/219; 220/567.2; 224/413; 280/833, 835
See application file for complete search history.

(56) References Cited

U.S. PATENT DOCUMENTS

| 4,871,041 | A | 10/1989 | Saito et al. | |
|---|---|---|---|---|
| 6,182,640 | B1 * | 2/2001 | Nakashima et al. | 123/516 |
| 6,253,790 | B1 * | 7/2001 | Hara | 137/565.17 |
| 6,401,750 | B2 * | 6/2002 | Tokunaga | 137/565.34 |
| 6,626,155 | B1 | 9/2003 | Ueda et al. | |
| 7,275,523 | B2 * | 10/2007 | Kimura et al. | 123/509 |
| 2005/0045399 | A1 * | 3/2005 | Kudo et al. | 180/219 |
| 2005/0126546 | A1 * | 6/2005 | Yagisawa | 123/509 |
| 2007/0023218 | A1 * | 2/2007 | Koike et al. | 180/219 |
| 2007/0089713 | A1 * | 4/2007 | Koike et al. | 123/509 |
| 2007/0216151 | A1 * | 9/2007 | Asamura et al. | 280/833 |
| 2007/0240925 | A1 * | 10/2007 | Kobayashi | 180/219 |
| 2008/0011534 | A1 * | 1/2008 | Miyashiro | 180/219 |

(Continued)

FOREIGN PATENT DOCUMENTS

JP 55-148958 11/1980

(Continued)

OTHER PUBLICATIONS

European Search Report; Aug. 31, 2009; 1 pages.

*Primary Examiner* — Anne Marie Boehler
*Assistant Examiner* — Marc Scharich
(74) *Attorney, Agent, or Firm* — Keating & Bennett, LLP (57) ABSTRACT

In a straddle type of vehicle having a fuel tank (30) with a built-in fuel pump (42), the fuel pump (42) is placed in the fuel tank (30) with the pump axis (A) directed nearly in the vehicle width direction. The straddling type of vehicle is provided that a nearly horizontal surface portion (31b) is formed on the bottom of the fuel tank (30) and the fuel pump (42) is placed on the nearly horizontal surface portion (31b) with the pump axis (A) directed nearly in the horizontal direction.

16 Claims, 12 Drawing Sheets

U.S. PATENT DOCUMENTS

2008/0314670 A1 * 12/2008 Buell et al. .................. 180/219

FOREIGN PATENT DOCUMENTS

| JP | 11-093794 | 4/1999 |
| --- | --- | --- |
| JP | 2000-072074 | 3/2000 |
| JP | 2000-282993 | 10/2000 |
| JP | 2001-082274 | 3/2001 |
| JP | 2001-082276 | 3/2001 |
| JP | 2002-106440 | 4/2002 |
| JP | 2003-049729 | 2/2003 |
| JP | 2003-120454 | 4/2003 |
| JP | 2003-120455 | 4/2003 |
| JP | 2003-148267 | 5/2003 |

* cited by examiner

STRADDLING TYPE OF VEHICLE

CROSS-REFERENCE TO RELATED APPLICATIONS

This application is a U.S. National Phase of International Application No. PCT/JP2005/000502, filed Jan. 17, 2005, which is based upon Japanese Patent Application No. 2004-018814, filed Jan. 27, 2004, each of which is hereby incorporated by reference in its entirety.

BACKGROUND OF THE INVENTION

1. Field of the Invention

The present invention generally relates to a straddle type of vehicle, such as a motorcycle having a fuel tank. More particularly, the present invention relates to a fuel system for such a vehicle.

2. Description of the Related Art

A motorcycle typically includes a fuel tank that has a fuel pump mounted inside the fuel tank. Sometimes, the fuel pump is mounted inside the tank on a bottom surface of the tank. The fuel pump draws fuel from around the bottom of the tank (see, for example, JP-A-2000-72074).

In such configurations, the fuel pump is attached to an upwardly opening cup. A fuel suction filter of the fuel pump is placed in the cup. A smaller diameter opening than the inside diameter of the cup is formed at the bottom of the fuel tank. A main portion of the fuel tank is inserted through the opening into the tank and the cup is secured to the fuel tank. Thus, the fuel in the fuel tank can be drawn out of the tank by the fuel pump without the fuel pressure being affected by changes in the fuel surface level due to acceleration, deceleration, and other attitude changes of the vehicle when the remaining amount in the fuel tank becomes small.

SUMMARY OF THE INVENTION

Because the fuel pump is placed in the fuel tank with the pump axis extending generally vertically, the height of the pump becomes a factor in fuel tank design. For instance, the tank ceiling must be configured to accommodate the fuel pump, which undesirably restricts the fuel tank design. With the pump axis directed vertically, when fuel moves back and forth relative to the vehicle, the fuel pump does not serve to baffle movement of the fuel. In some cases, the fuel flows away from the fuel pump inlet and cannot be picked up by the fuel pump. In addition, the fuel pump mounting configuration described above is complicated and results in the cup projecting out of the fuel tank bottom into positions that can make difficult the attachment of fuel lines.

Thus, one aspect of an embodiment of the present invention provides a straddle type of vehicle that is configured to improve fuel pick up even during changes in the fuel level caused by acceleration, deceleration, and other changes in the attitude of the vehicle. Another aspect of an embodiment of the present invention simplifies attachment of the fuel pump which eases assembly and routing of fuel lines and the like. A further aspect of an embodiment of the present invention involves providing a mounting configuration for a fuel pump that does not cause the attaching portion of the fuel pump to excessively project out of the fuel tank.

Another aspect of an embodiment of the present invention comprises a straddle type vehicle comprising a fuel tank. A fuel pump assembly is positioned at least partially inside of the fuel tank. An opening is defined within the fuel tank. The fuel pump assembly comprises a pump axis that extends generally transversely relative to the straddle type vehicle.

A further aspect of an embodiment of the present invention comprises a straddle type vehicle comprising a frame assembly. A fuel tank straddles the frame assembly in a transverse direction of the vehicle. A fuel pump assembly extends into the fuel tank. The fuel tank comprises a generally horizontal surface portion formed on a bottom of the fuel tank. The fuel pump is mounted to the generally horizontal surface portion with a pump axis of the fuel pump assembly extending generally horizontally.

BRIEF DESCRIPTION OF THE DRAWINGS

These and other features, aspects and advantages of the present invention will now be described with reference to the drawings of one or more preferred embodiment, which embodiment is intended to illustrate and not to limit the invention, and in which figures.

DETAILED DESCRIPTION OF THE PREFERRED EMBODIMENT

In the following description, the terms "front," "rear," "left," "right," "up," and "down" are used from the vantage point of a rider unless otherwise understood from the context for use. In the accompanying figures, the symbol "Fr" denotes forward, the symbol "Rr" denotes rearward, the symbol "L" denotes leftward, and the symbol "R" denotes rightward.

Figure 1:
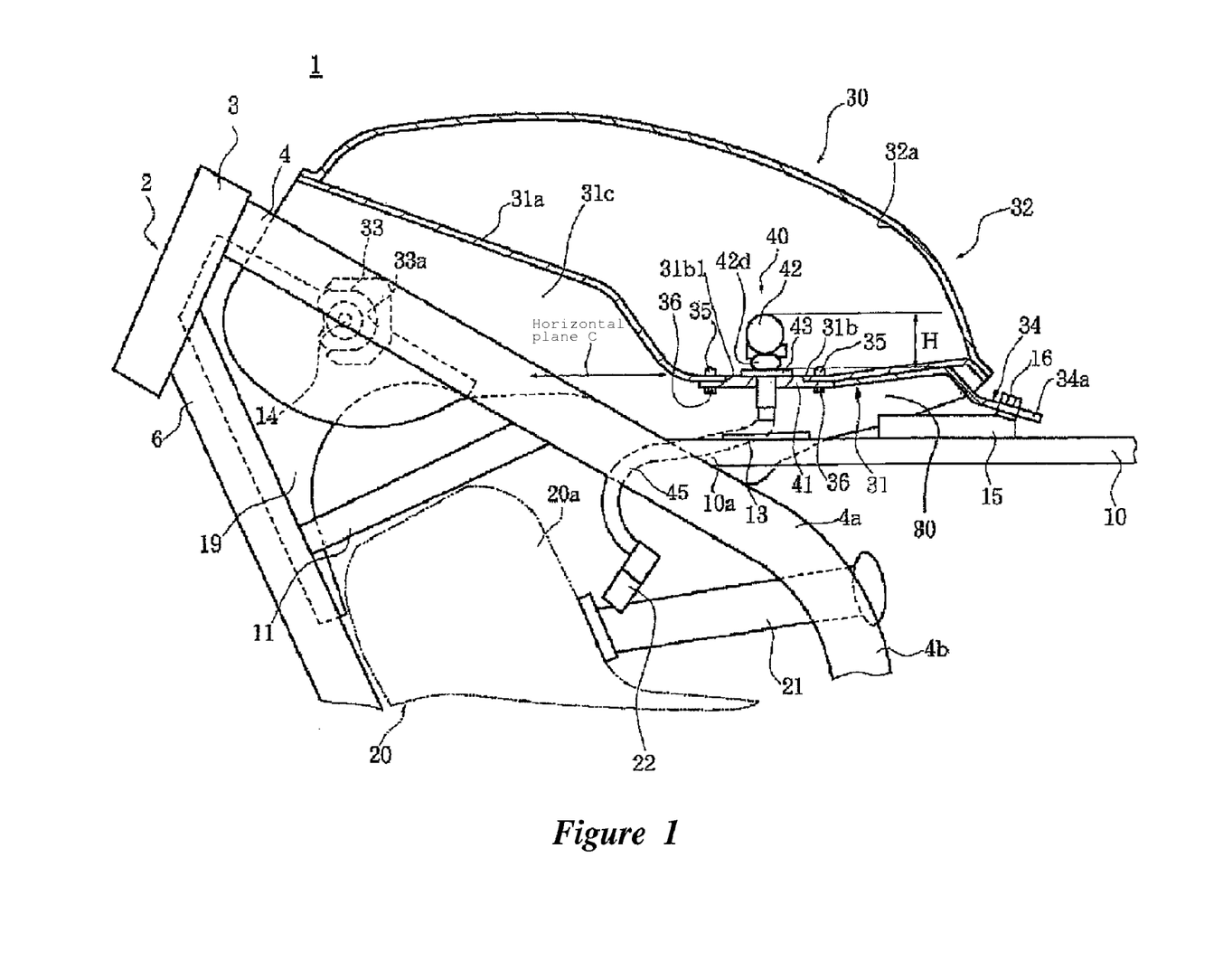
FIG. 1 is a partially sectioned side view of a portion of a fuel system of a straddle type vehicle, which fuel system is arranged and configured in accordance with certain features, aspects and advantages of the present invention.

With reference initially to FIG. 1, a straddle type vehicle is illustrated. In the illustrated configuration, the straddle type vehicle comprises a motorcycle 1. In the illustrated motorcycle 1, a vehicle body frame 2 comprises a head pipe 3 and a main frame 4. The main frame 4 extends obliquely downward from the head pipe 3 with the rear portion of the main frame 4 curving and extending downward. In this way, the main frame 4 extends through a downward curve portion 4a to a rear arm pivot portion 4b. The body frame 2 also comprises a pair of right and left seat rails 10 that are connected by welding the connecting portions 10a of the pair of right and left seat rails 10 to the main frame 4. In the illustrated configuration, the seat rails 10 are secured to the main frame 4 at positions before the curve portion 4a of the main frame 4. A connection plate 13 interconnects the front portions of the right and left seat rails 10.

The body frame 2 also comprises a down tube 6 that extends obliquely downward in a rearward direction from a lower part of the head pipe 3. The rear part of the down tube 6 can curve and extend downward in a rearward direction such that it connects to the lower part of the rear arm pivot portion 4b.

The forward portions of the head pipe 3, the main frame 4, and the down tube 6 can be reinforced by a reinforcing bracket 19. The reinforcing bracket 19 can interconnect two or more of these components. The main frame 4 and the down tube 6 can be reinforced further by another reinforcing member 11 that is located behind the reinforcing bracket 19.

An engine 20 can be mounted in a space defined within the vehicle body frame 2, which is primarily defined by the head pipe 3, the main frame 4, and the down tube 6. An intake pipe 21 can be connected to a cylinder 20a of the engine 20. A fuel injection valve 22 can be connected to the intake pipe 21. In one configuration, the fuel injection valve 22 extends upward from the intake pipe 21. Fuel can be injected through the fuel injection valve 22 to supply a mixture of air and fuel into the cylinder 20a.

A fuel tank 30 can be mounted to or positioned above the front upper portions of the main frame 4 and the right and left seat rails 10. The fuel tank 30 preferably straddles the vehicle body frame 2 in the vehicle width direction. A fuel pump unit 40 can be provided inside the fuel tank 30. In one configuration, the fuel pump unit 40 preferably comprises a fuel pump 42 and a support plate 43. The fuel pump 42 can be placed in the fuel tank 30 with its pump axis A directed generally side to side (i.e., a generally transverse orientation) with respect to the vehicle. In the embodiment shown in FIG. 5, the fuel pump 42 is placed in the fuel tank 30 with its pump axis A directed in the vehicle width direction B. In the embodiment shown in FIG. 6, the direction may be slightly offset from the vehicle width direction B, with a small tilt angle to the vehicle width direction B. In some less desirable configurations, the pump axis A of the fuel pump 42 may extend along the longitudinal direction of the vehicle.

In the illustrated configuration, the fuel tank 30 comprises a bottom plate 31 and a tank body 32 secured to the bottom plate 31. In one configuration, the tank body 32 covers the bottom plate 31. Preferably, the bottom plate 31 is welded to the tank body 32.

Figure 4:
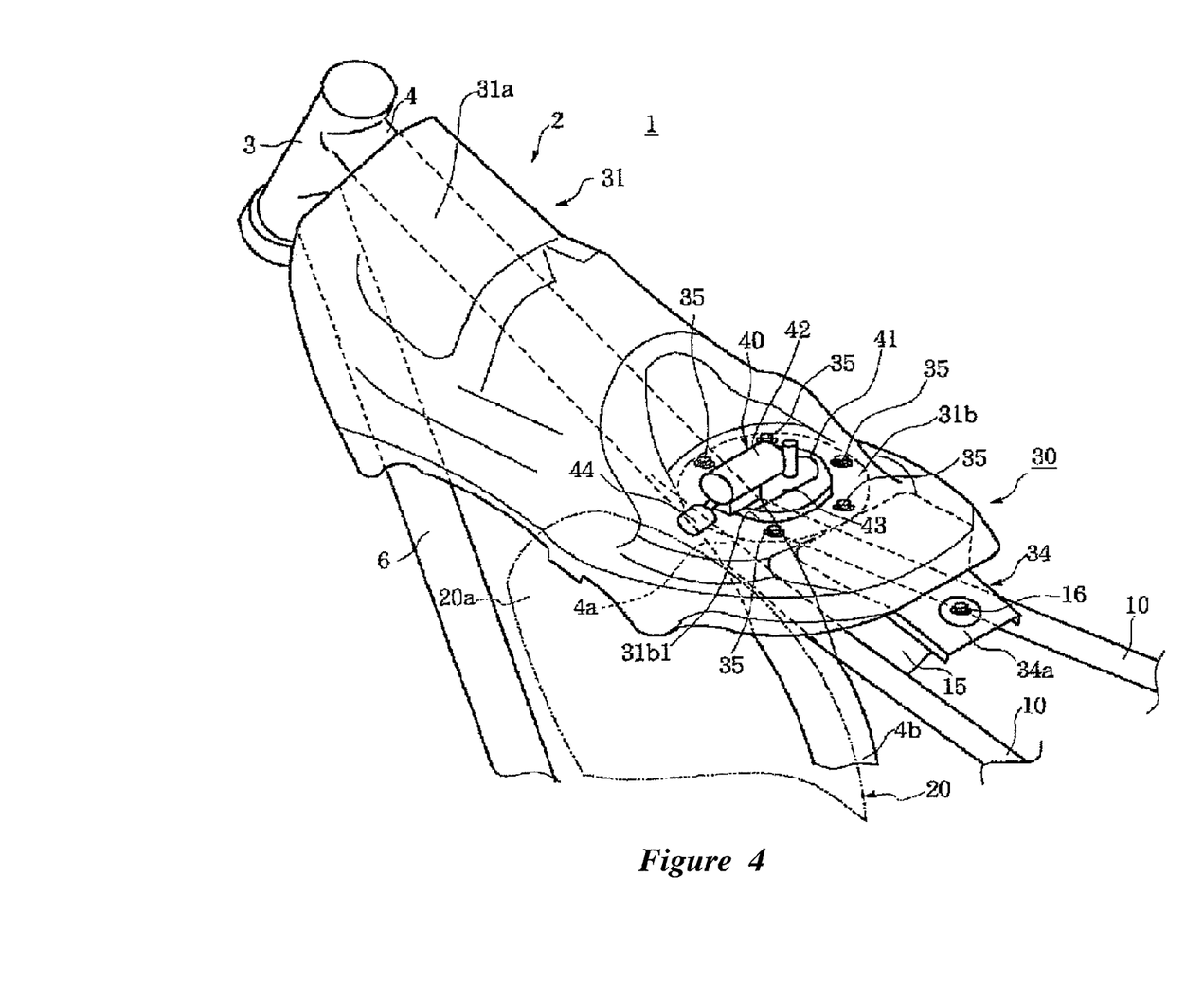
FIG. 4 is a perspective view of the lower part of the portion of the fuel system of FIG. 1.

With reference to FIG. 1 and FIG. 4, the bottom plate 31 preferably comprises a tunnel-like recess section 31a and a nearly horizontal portion 31b. In one configuration, the recess section 31a straddles the main frame 4. In another configuration, the recess section 31 accommodates a frame member while the nearly horizontal portion 31b is positioned rearward of the frame member accommodated by the recess section 31 and the nearly horizontal portion 31b is positioned above another nearly horizontally extending frame member. In the one configuration, the recess section 31a is defined only in a forward portion of the fuel tank 30 while the nearly horizontal portion 31b is defined only in a rearward portion of the fuel tank 30. In the illustrated configuration, the recess section 31a is formed only in the front half of the interior of the fuel tank 30, while the nearly horizontal portion 31b is formed only in the rear half of the interior of the fuel tank 30.

Front attaching members 33 preferably are secured to the outside opposing surfaces 31c of the tunnel-like recess section 31a of the bottom plate 31. In one configuration, the front attaching members 33 are welded to the outside opposing surfaces 31c or another suitable portion of the fuel tank 30. Each of the illustrated front attaching members 33 has an engaging portion 33a that is open forward. The engaging portion 33a receives an attaching bracket 14 that is secured to the right and left sides of the main frame 4. In one configuration, the attaching bracket 14 is welded to the main frame 4.

An attaching plate 34 can be secured to the nearly horizontal surface portion 31b. In one configuration, the attaching plate 34 can be welded to the nearly horizontal surface portion 31b. The attaching plate 34 preferably has a rearward extending attaching lug 34a. The attaching lug 34a can be secured by a fastener 16 (e.g., bolt) to an attaching bracket 15 of the paired right and left seat rails 10.

A pump attaching opening 31b1 can be formed in the nearly horizontal surface portion 31b. Cap nuts 35 can be secured to any number of positions around the pump attaching opening 31b1. In one arrangement, six cap nuts 35 can be welded in position around the periphery of the pump attaching opening 31b1. Other suitable configurations, either using cap nuts or using other elements, can be used. A pump unit attaching base (e.g., a fuel pump attaching portion) 41 can be attached from under to the pump attaching opening 31b1. In one configuration, bolts 36 are inserted from underneath to engage with the cap nuts 35 and the pump unit attaching base 41 can be secured in position when the bolts 36 are tightened.

Figure 7:
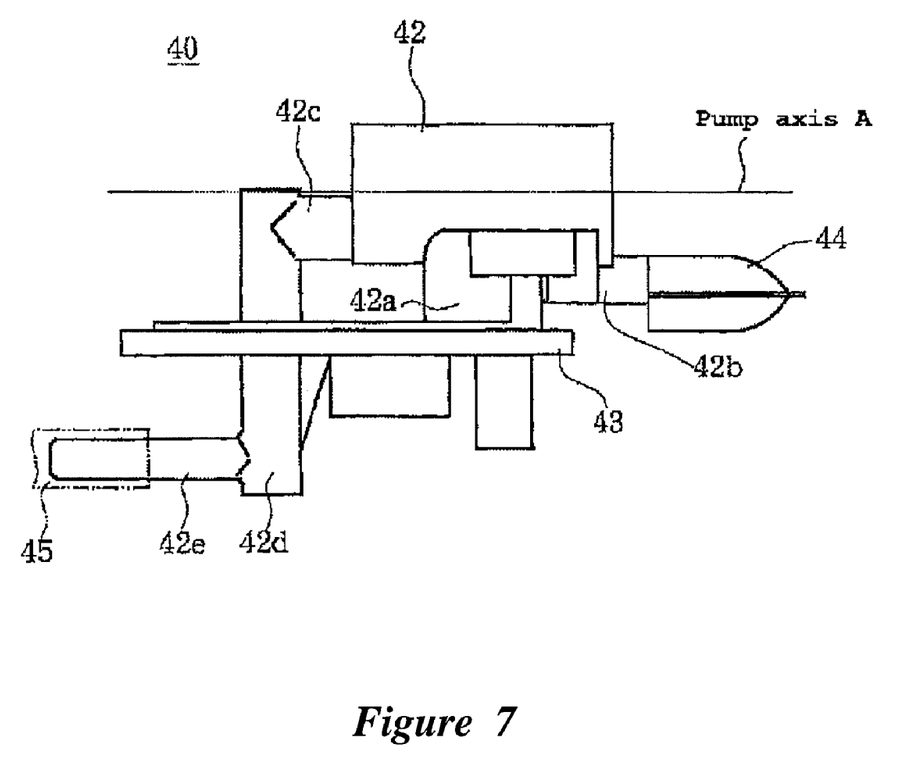
FIG. 7 is a side view of the fuel pump unit.
Figure 8:
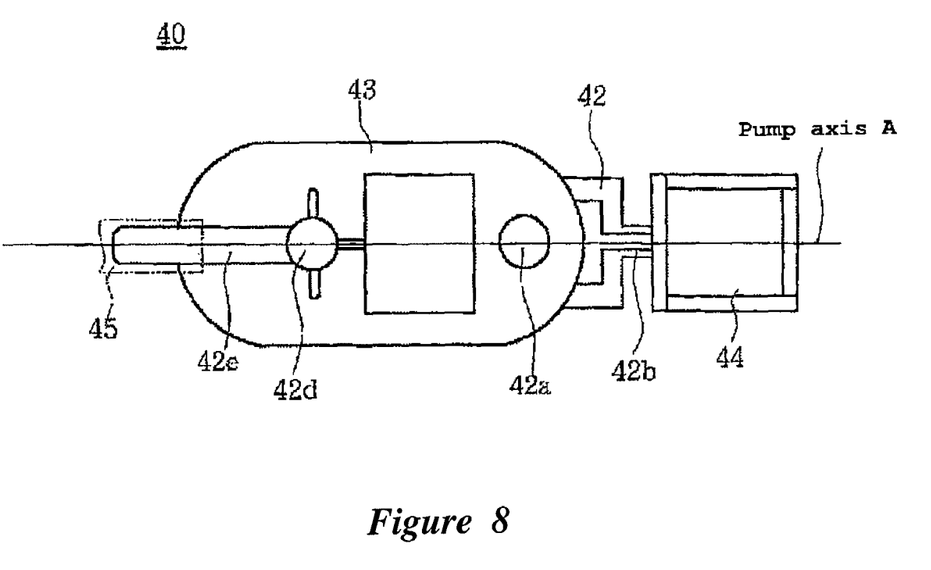
FIG. 8 is a bottom view of the fuel pump unit of FIG. 7.
Figure 9:
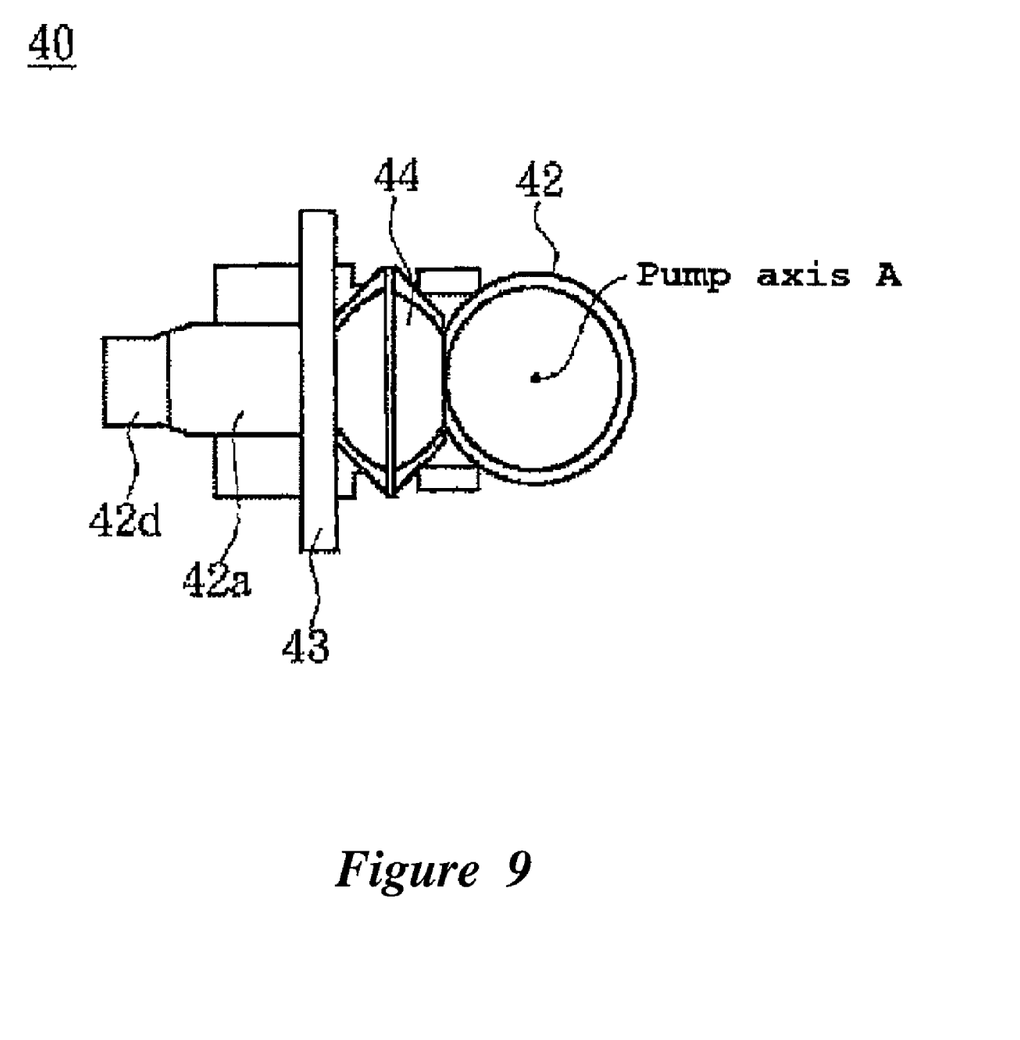
FIG. 9 is a right side view the fuel pump unit of FIG. 7.

With reference now to FIG. 7, FIG. 8 and FIG. 9, the pump attaching portion 42a of the fuel pump 42 can be secured to a support plate 43. In one configuration, the fuel pump 42 is positioned such that its suction port 42b and its delivery port 42c extend in opposing directions along the pump axis A. A pump filter 44 can be provided at the fore-end of the suction port 42b. A takeout pipe 42d can be connected to the delivery port 42c. The takeout pipe 42d preferably extends through the support plate 43. A fuel hose connecting portion 42e can extend generally parallel to the pump axis A at the fore-end of the takeout pipe 42d. A fuel hose 45 can be connected to the fuel hose connecting portion 42e. The fuel hose 45 preferably extends in the direction opposite to the suction port 42b. More preferably, the fuel hose 45 extends generally in the same direction as the pump axis A of the fuel pump 42. The fuel hose 45 can curve from right to left above the main frame 4 and can be connected from the left side to the fuel injection valve (injector) 22 located below the main frame 4. Other configurations also are possible.

Figure 2:
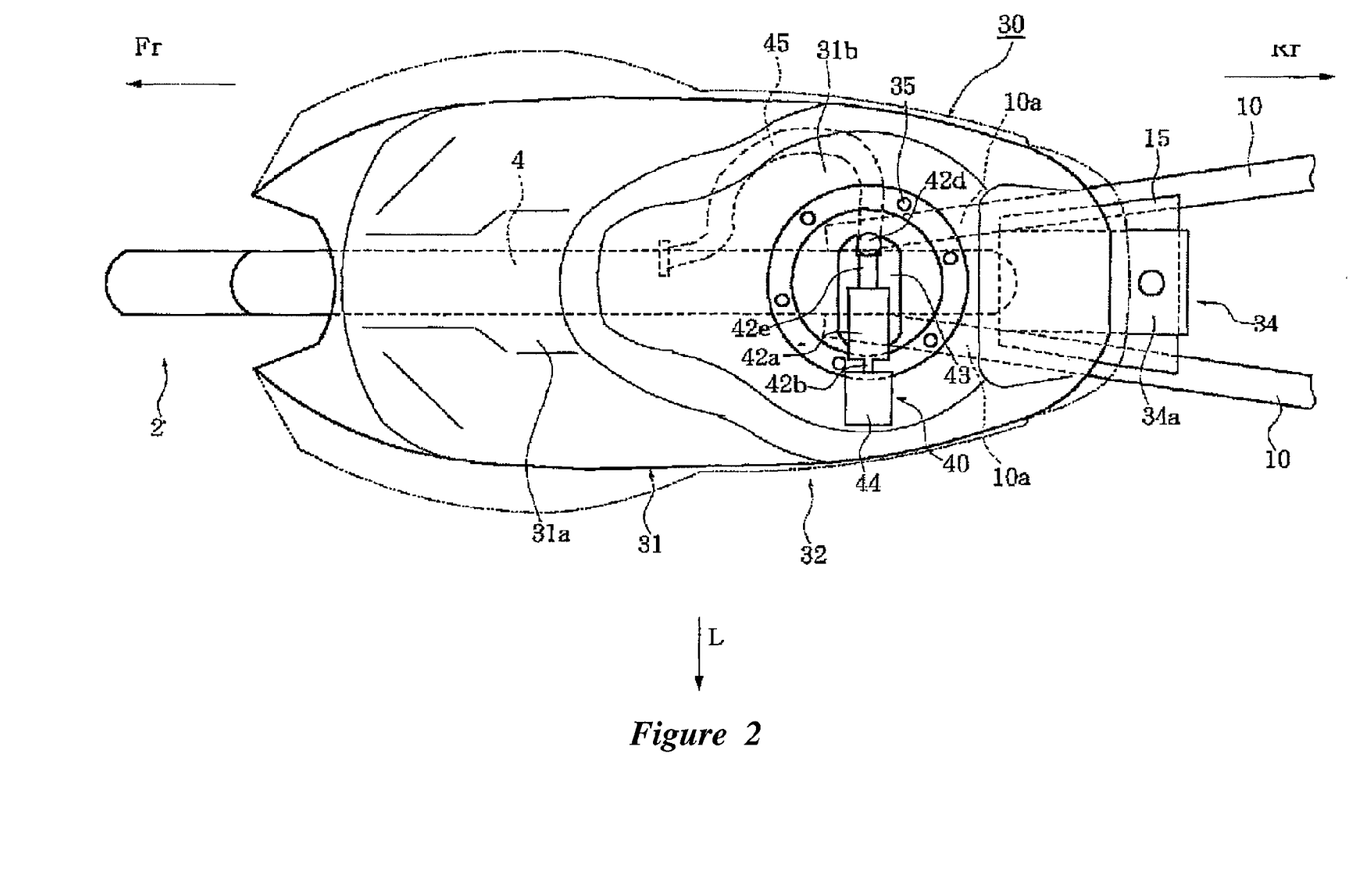
FIG. 2 is a partially sectioned plan view of the portion of the fuel system of FIG. 1.
Figure 3:
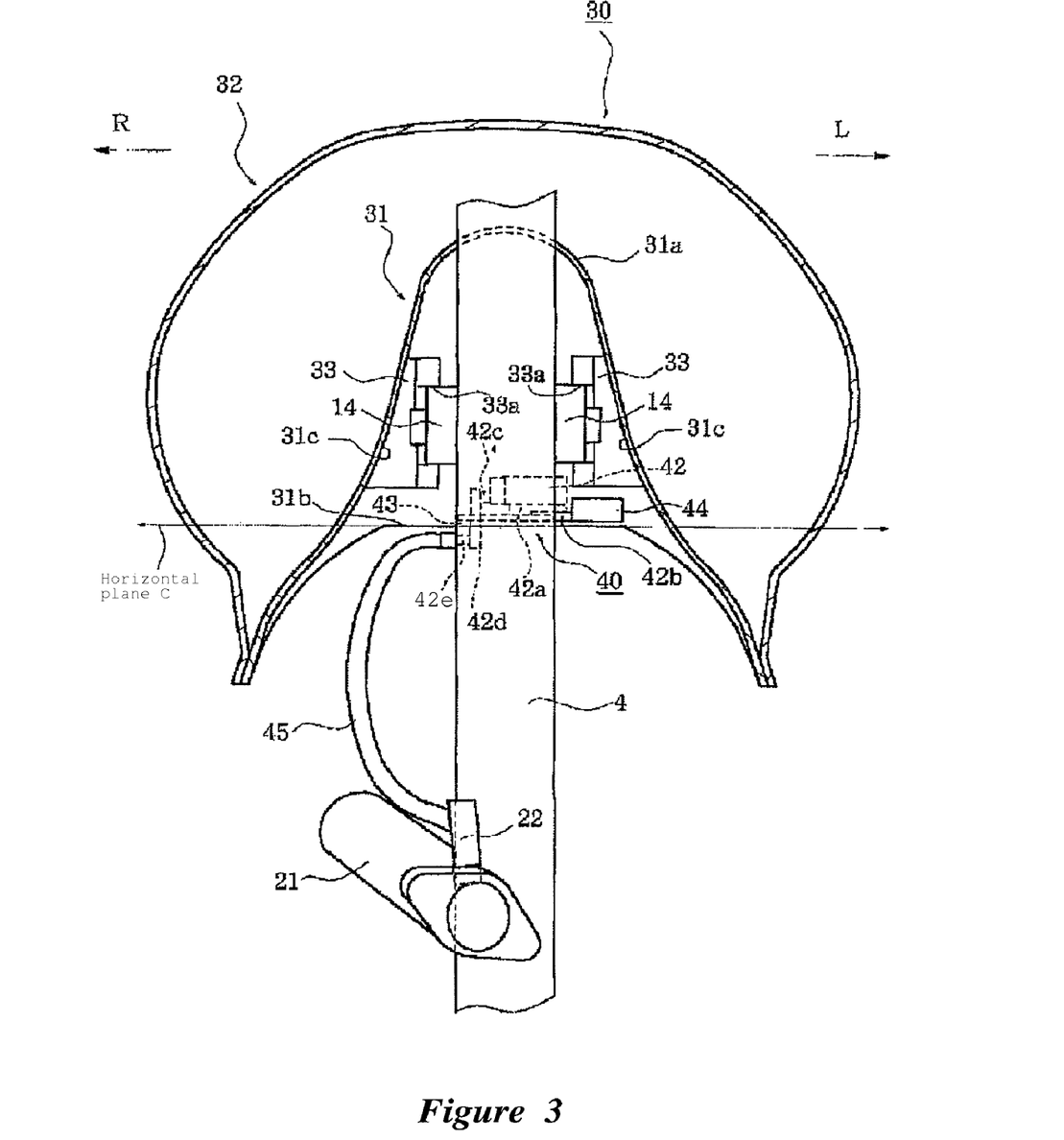
FIG. 3 is a partially sectioned front elevation view of the portion of the fuel system of FIG. 1.

With reference now to FIG. 1, FIG. 2 and FIG. 3, the bottom of the illustrated fuel tank 30 is formed with the nearly horizontal surface portion 31b to which is attached the fuel pump 42 with the pump axis A nearly in a horizontal plane C. A control unit and other components (not shown) can be provided in the space between the tunnel-like recess section 31a and the main frame 4. The fuel pump 42 preferably is placed behind the tunnel-like recess section 31a.

Figure 5:
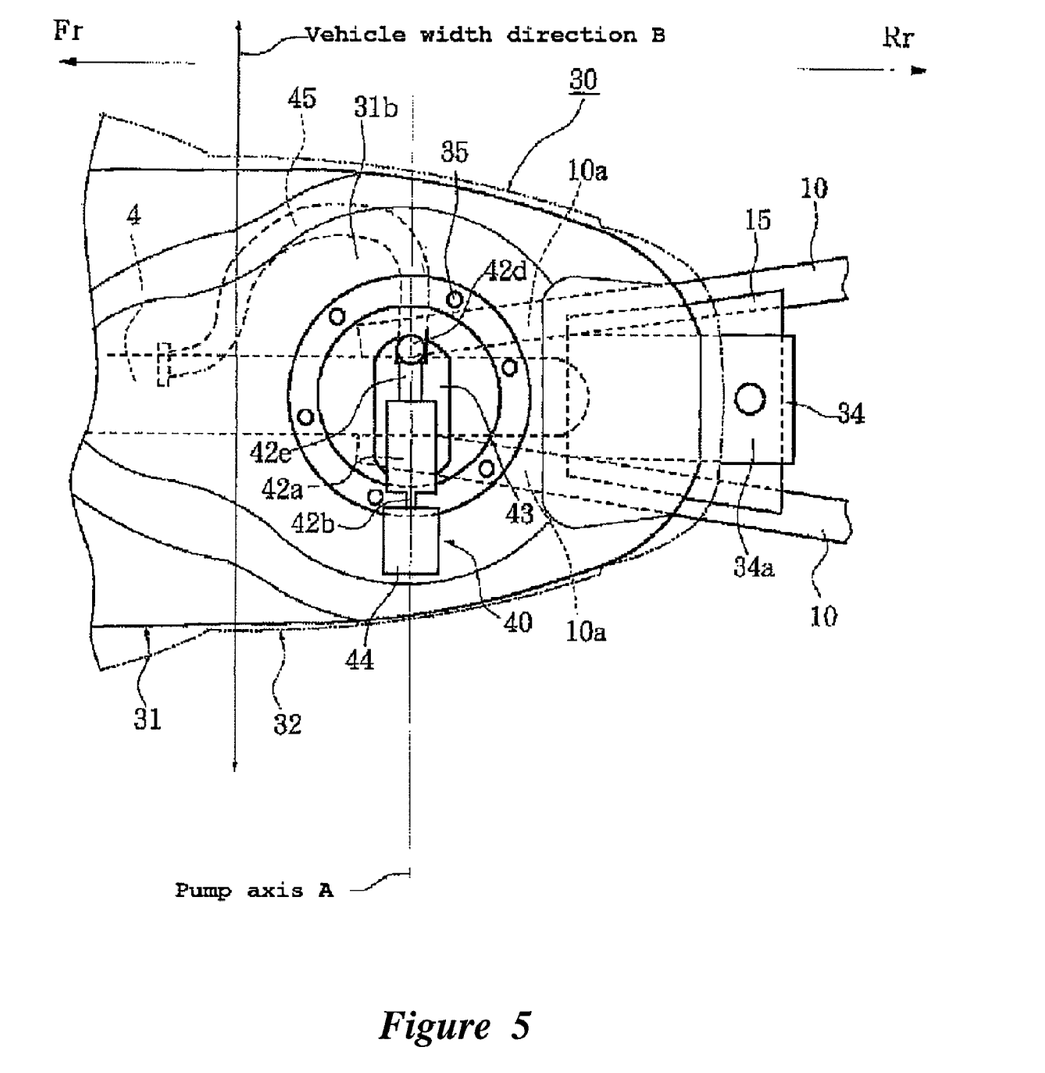
FIG. 5 is a partial view of FIG. 2 showing the orientation of a fuel pump of the fuel system of FIG. 1.
Figure 6:
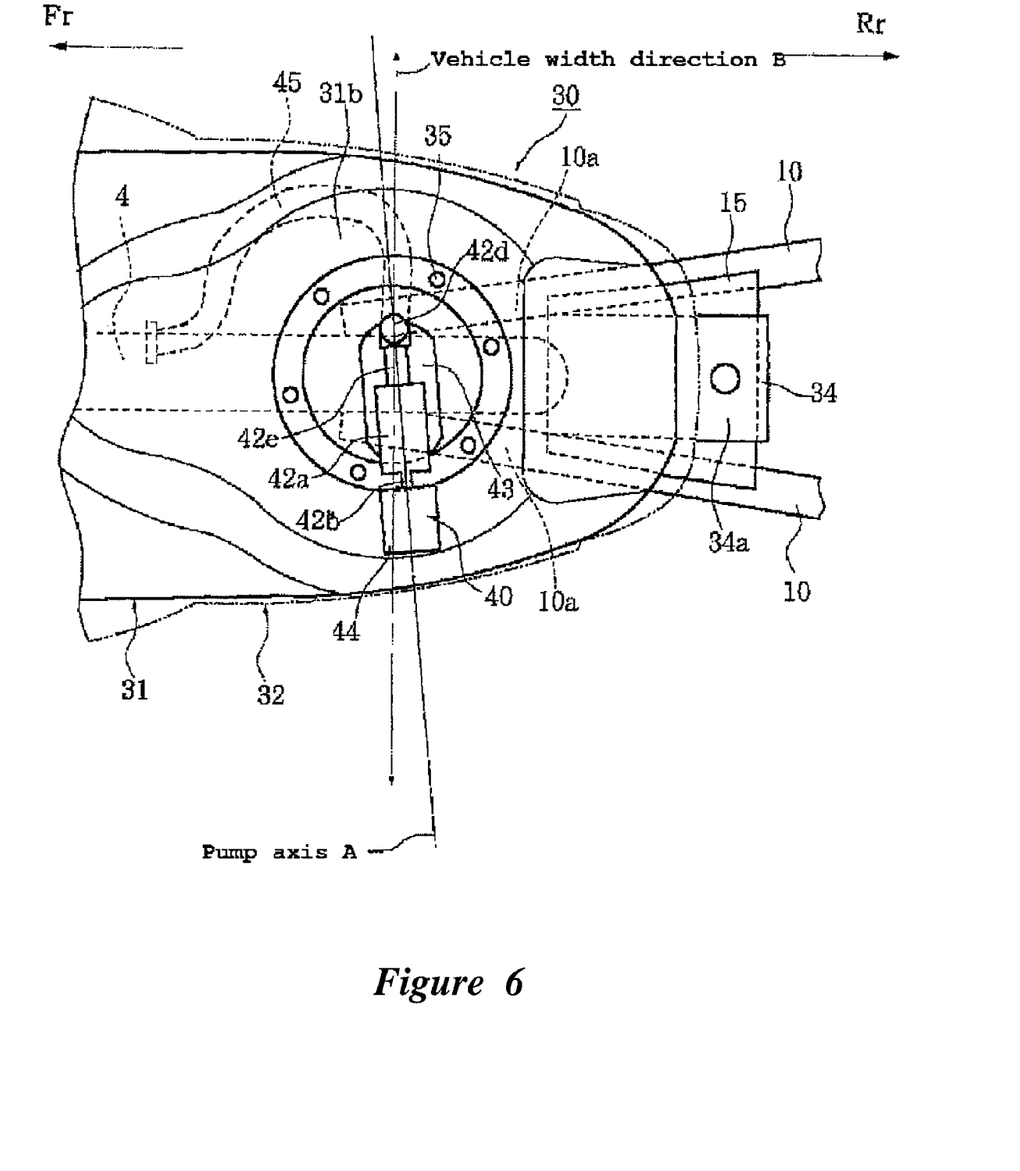
FIG. 6 is a partial view similar to FIG. 5 showing another orientation of the fuel pump of the fuel system of FIG. 1.

With reference to FIG. 5 and FIG. 6, because the fuel pump 42 is placed in the fuel tank 30 with the pump axis A extending generally the transverse direction B, the height H of the fuel pump 42 including the suction port 42b and the delivery port 42c is reduced. FIG. 1 shows the low height H of the fuel pump 42. The low height H of the fuel pump 42 makes it possible to place the fuel pump 42 in the fuel tank 30 without affecting the shape of the tank ceiling 32a.

With reference to FIG. 5 and FIG. 6, when fuel moves back and forth as the vehicle accelerates or decelerates, the transversely-mounted fuel pump 42 (i.e., the fuel pump 42 with its pump axis A extending generally in the vehicle width direction B) helps baffle or restrict movement of the fuel (e.g., reduces fuel sloshing) relative to a fuel pump mounted with its pump axis directed in the longitudinal direction of the vehicle. Thus, the transversely-mounted fuel pump 42 improves fuel pickup by the fuel pump 42 during acceleration and deceleration.

In one preferred configuration, such as that shown in FIG. 1, FIG. 2 and FIG. 3, the generally horizontal surface portion 31b of the fuel tank 30 preferably extends in the generally horizontal plane C at a location corresponding to the pump axis A of the fuel pump 42. As a result, the height H of the fuel pump 42 is lowered and the fuel pump 42 can be placed in the fuel tank 30 without affecting shape of the tank ceiling 32a. The pump attaching opening 31b1 can be punched in the same direction as a die stroke while the bottom plate 31 is being press formed. Accordingly, the tank bottom wall is easily fabricated.

With reference now to FIG. 1, the fuel pump 42 preferably is positioned in a rearward portion of the fuel tank 30 because the main frame 4 extends obliquely downward in a rearward direction such that the rearward portion of the fuel tank can be lower than the forward portion without interfering with the main frame 4. Thus, because the fuel pump 42 is located in a lower portion of the fuel tank 30 (which is a rearward portion in the illustrated construction) fuel pickup is improved during low fuel situations.

With reference to FIG. 1, the tunnel-like recess section 31a of the fuel tank 30 preferably straddles the main frame 4 only in the front portion of the fuel tank 30 and the fuel pump 42 preferably is positioned behind the tunnel-like recess section 31a. With such a construction, fuel pickup by the fuel pump 42 is improved even during low fuel situations. Moreover, the position of the fuel pump 42 as shown in FIG. 1 is generally above the curved portion 4a of the main frame 4. Accordingly, a space 80 is formed by the curved portion 4a and the bottom plate 31 of the fuel tank 30. The space 80 provides routing and connecting space for the fuel hose 45, which extends below the fuel pump 42.

With reference now to FIG. 10, FIG. 11 and FIG. 12(A)-12(C), another embodiment having many of the same parts as the first embodiment. Those, the same reference numerals will be used to refer to the same or corresponding components. Moreover, to reduce duplicative description, some of the components discussed above will not be reintroduced and discussed above below.

Figure 10:
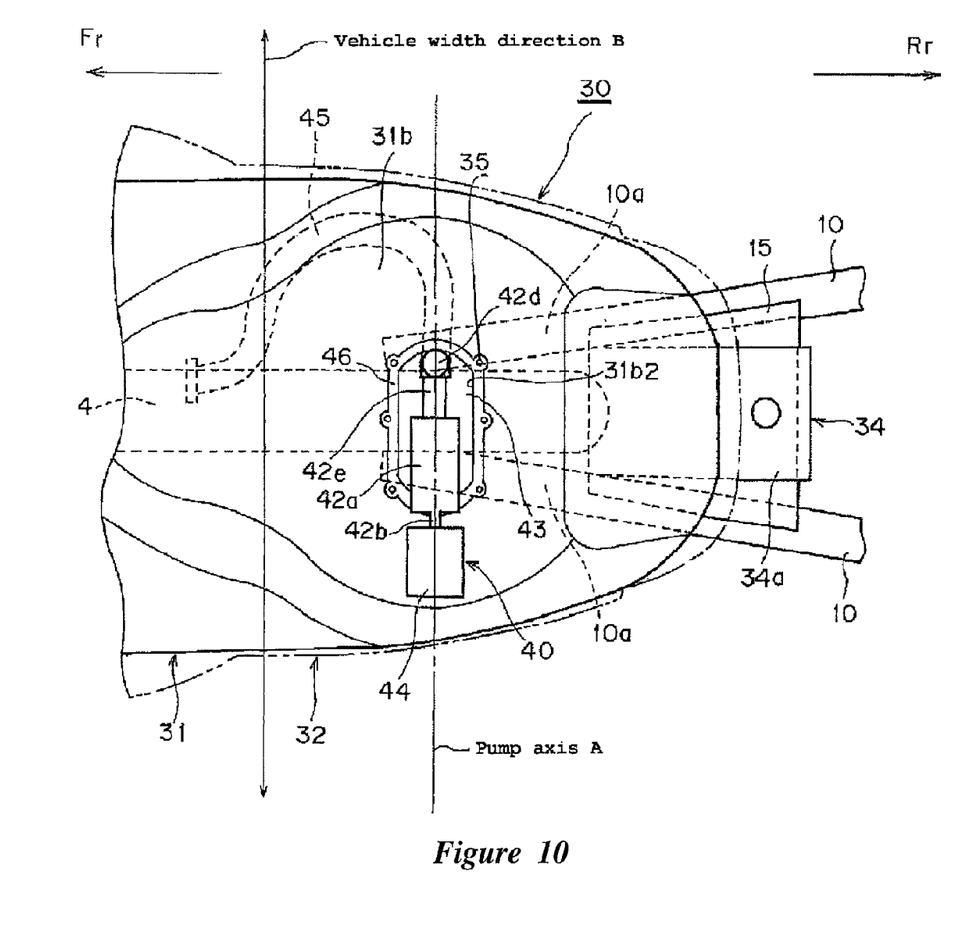
FIG. 10 is a partial view similar to that of FIG. 5 showing another embodiment of a fuel system that is arranged and configured in accordance with certain features, aspects and advantages of the present invention.
Figure 11:
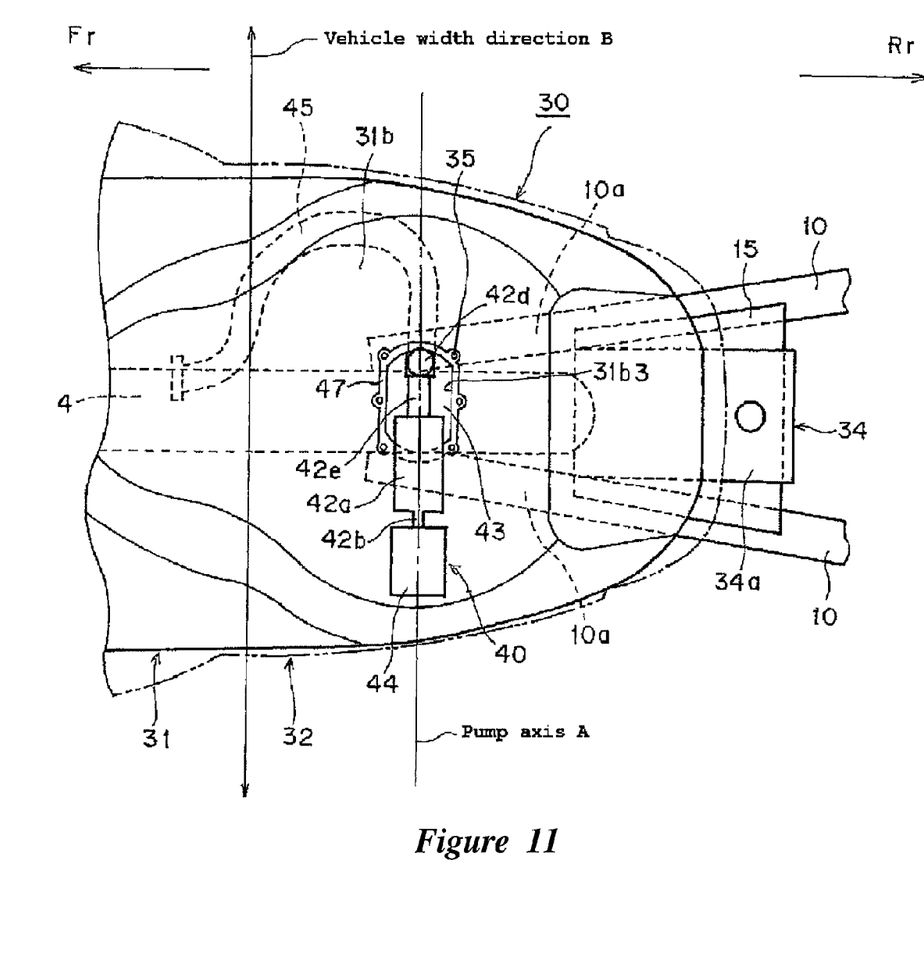
FIG. 11 is a partial view similar to that of FIG. 5 showing a further embodiment of a fuel system that is arranged and configured in accordance with certain features, aspects and advantages of the present invention.

With reference now to FIG. 10 and FIG. 11, the shape of the pump unit attaching base 46 or 47 is shown in solid lines in order to make clear its shape. Actually, however, the pump unit attaching base 46 or 47 is attached below the nearly horizontal surface portion 31b of the fuel tank 30 and, therefore, would not properly be shown in solid lines in the drawing. In other words, the base 46 or 47 is positioned under the portion 31b and not overtop of the portion 31b.

With reference to FIG. 10, the pump attaching opening 31b2 of the fuel tank 30 has a reduced size when compared to the opening 31b1 or FIG. 1. The smaller opening 31b2 preferably is sized as small as possible while still permitting the insertion of the fuel pump unit 40. The shape and the size of the pump attaching opening 31b2 are made in an ellipse approximately identical with the support plate 43 of the pump unit 40.

On the other hand, the pump unit attaching base (fuel pump attaching portion) 46 for attaching the pump unit 40 from under the pump attaching opening 31b2 is made about one size larger than the pump attaching opening 31b2 while preferably not being greatly oversized relative to the opening 31b2 (i.e., the base 46 is slightly larger than the opening 31b2). The base 46 preferably is generally elliptical in shape. The base 46 preferably is sufficiently sized to permit closure of the pump attaching opening 31b2. Moreover, in the illustrated configuration, the longitudinal directions (i.e., the major axis) of the pump attaching opening 31b2 and the pump unit attaching base 46 correspond with the pump axis A of the fuel pump unit 40.

Incidentally, the shape of the pump unit attaching opening 31b2 is not limited to the ellipse but may be changed to elongate holes such as a rectangle with four corners rounded, or an oval. Other shapes also can be used. Although the shape of the pump unit attaching opening 31b2 is preferably elongate and round in consideration of ease of passing the fuel pump unit 40 to be described later, it may be a true circle or oval, and may be small to the limit of permitting insertion of the fuel pump unit 40.

With reference to FIG. 11, a pump attaching opening 31b3 of the fuel tank 30 may be an ellipse that is smaller than the pump attaching opening 31b2 described above. In such a situation, a support plate 43 of nearly the same shape and size as the pump attaching opening 31b3 can be provided and a pump unit attaching base (fuel pump attaching portion) 47 greater by one size than, and similar in shape to, the pump attaching opening 31b3 can be provided with the support plate 43 being positioned between the pump axis A and the base 47. In addition, in the arrangement of FIG. 11, the support plate 43 preferably does not extend under the full length of the pump 42. More preferably, the support plate 43 extends under less than half of the pump 42.

Figure 12A:
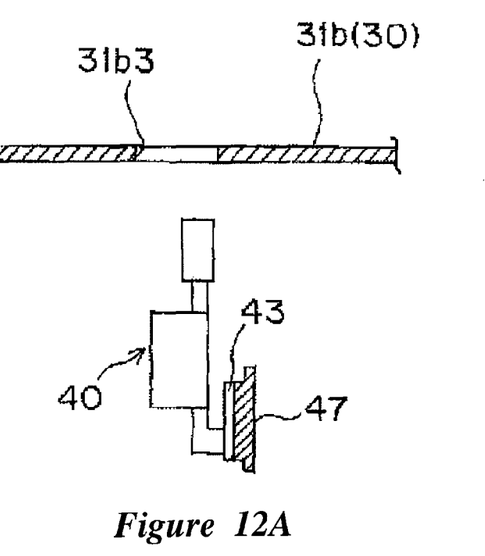
FIGS. 12A-12C are partially sectioned side views showing a sequence for attaching a fuel pump unit that is arranged and configured in accordance with certain features, aspects and advantages of an embodiment of the present invention.
Figure 12B:
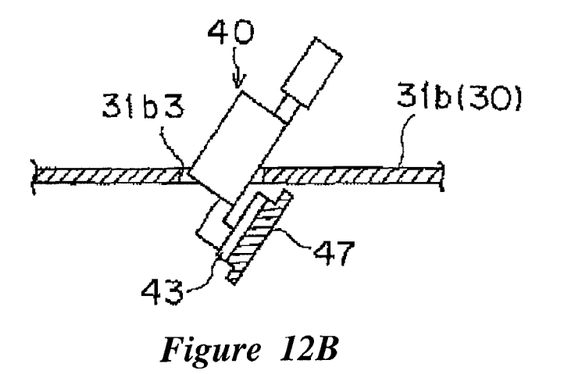
Figure 12C:
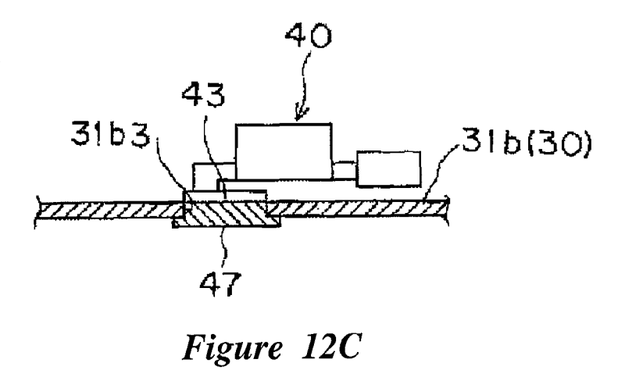

With reference to FIG. 12(A), FIG. 12(B) and FIG. 12(C), the fuel pump unit 40 of FIG. 11 is inserted and installed in the following manner. First, as shown in FIG. 12A, the fuel pump unit 40, which preferably is longer than wide with the pump axis A extending along its length, is inserted into the pump attaching opening 31b3. The end of the fuel pump unit 40 opposite the base 47 preferably is inserted first. Next, as shown in FIG. 12B, the pump unit 40, while it is being turned, is further inserted into the pump attaching opening 31b3. After that, as shown in FIG. 12C, the pump unit attaching base 47 is secured under the pump attaching opening 31b3.

In the configurations of FIG. 11 and FIG. 12, downsizing the pump attaching opening 31b2 or 31b3 of the fuel tank 30 approximately to the limit of allowing insertion of the fuel pump unit 40 results in a better sealing of the fuel tank. In addition, elongating the shape of the pump attaching opening 31b2 or 31b3 facilitates insertion of the fuel pump unit 40, which is elongated along the direction of the pump axis A. Furthermore, downsizing the pump unit attaching base 46 or 47 that is secured to the pump attaching opening 31b2 or 31b3 makes it possible to increase the capacity of the fuel tank 30 by downsizing the area of the nearly horizontal surface portion 31b formed on the bottom of the fuel tank 30.

In addition, if the pump unit attaching base 47 is shrunk to the limit of permitting closure of the pump attaching opening 31b3 and if the base 47 is located on only one end portion of the pump unit 40, the pump unit 40 may be easily inserted from the opposite end relative to the base 47 into the pump attaching opening 31b3 (see, e.g., FIG. 11).

This invention may be applied to the straddling type of vehicle such as the motorcycle and motor-tricycle having a fuel tank with a built-in fuel pump to draw out and supply fuel through a fuel pump to an engine. Other vehicles also may benefit from certain features, aspects and advantages of the embodiments of the present invention.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired. Moreover, not all of the features, aspects and advantages are necessarily required to practice the present invention. Accordingly, the scope of the present invention is intended to be defined only by the claims that follow.

What is claimed is:

1. A straddle type vehicle comprising:
   a fuel tank including an opening; and
   a fuel pump assembly positioned at least partially inside of the fuel tank, the fuel pump assembly including a fuel pump; wherein
   the fuel pump has a length longer than a width and a pump axis extending along the length of the fuel pump; and
   the pump axis extends substantially in a width direction of the vehicle.
2. The straddle type vehicle of claim 1, wherein the opening has a size that permits insertion of the fuel pump assembly into the fuel tank.
3. The straddle type vehicle of claim 2, wherein the opening has an elongated shape.
4. The straddle type vehicle of claim 3, wherein the fuel pump assembly includes an attaching portion having a size slightly larger than the size of the opening such that the attaching portion can be arranged to close the opening.
5. The straddle type vehicle of claim 4, wherein the attaching portion is positioned under only a portion of the fuel pump.
6. The straddle type vehicle of claim 5, wherein the attaching portion is positioned under less than half of the fuel pump.
7. The straddle type vehicle of claim 1, further comprising:
   a frame assembly including a frame component that extends at an angle downward and rearward such that a rear portion of the frame component is lower than a forward portion of the frame component; wherein
   the fuel tank straddles the frame assembly in the width direction of the vehicle; and
   the fuel pump assembly is positioned in a rearward portion of the fuel tank.
8. The straddle type vehicle of claim 1, wherein the pump axis extends substantially in a horizontal direction.
9. A straddle type vehicle comprising:
   a frame assembly;
   a fuel tank straddling the frame assembly in a width direction of the vehicle, the fuel tank including a substantially horizontal surface portion at a bottom of the fuel tank; and
   a fuel pump assembly in the fuel tank, the fuel pump assembly including a fuel pump; wherein
   the fuel pump has a length longer than a width and a pump axis extending along the length of the fuel pump;
   the fuel pump is mounted to the substantially horizontal surface portion with the pump axis of the fuel pump extending substantially in the width direction of the vehicle.
10. The straddle type vehicle of claim 9, wherein the fuel tank includes a pump attaching opening defined in at least a portion of the substantially horizontal surface portion, and the pump attaching opening has a size to permit insertion of the fuel pump assembly into the fuel tank.
11. The straddle type vehicle of claim 10, wherein the pump attaching opening has an elongated shape.
12. The straddle type vehicle of claim 10, wherein the fuel pump assembly includes an attaching portion having a size slightly larger than the size of the pump attaching opening such that the attaching portion can be arranged to close the pump attaching opening.
13. The straddle type vehicle of claim 12, wherein the attaching portion is positioned under only a portion of the fuel pump.
14. The straddle type vehicle of claim 13, wherein the attaching portion is positioned under less than half of the fuel pump.
15. The straddle type vehicle of claim 9, wherein the frame assembly includes a frame component that extends at an angle downward and rearward such that a rear portion of the frame component is lower than a forward portion of the frame component; and
   the fuel pump assembly is positioned in a rearward portion of the fuel tank.
16. The straddle type vehicle of claim 9, wherein the fuel tank includes a recessed forward portion, the frame assembly extends alongside the recessed forward portion such that the fuel tank straddles the frame assembly, and the fuel pump assembly is positioned rearward of the recessed forward portion of the fuel tank.

* * * * *